United States Patent [19]
Barts et al.

[11] Patent Number: 5,290,053
[45] Date of Patent: Mar. 1, 1994

[54] HIGH-BICYCLE FRAME

[76] Inventors: Danny L. Barts, 915 S. Fifth St.; James H. Altman, 405 N. Third St., both of Mebane, N.C. 27302

[21] Appl. No.: 847,953
[22] Filed: Mar. 6, 1992
[51] Int. Cl.$^5$ ............... B62K 3/02; B62K 19/00
[52] U.S. Cl. ..................... 280/281.1; D12/111
[58] Field of Search ............. 280/281.1, 274; D12/111, 112

[56] References Cited

U.S. PATENT DOCUMENTS

| | | | |
|---|---|---|---|
| D. 238,419 | 1/1976 | Apodaca | D12/111 |
| D. 243,165 | 1/1977 | Wheeler | D12/111 |
| D. 277,744 | 2/1985 | Traylor | D12/111 |
| D. 278,324 | 4/1985 | Breen | D12/111 |

Primary Examiner—Mitchell J. Hill

[57] ABSTRACT

A high-bicycle frame for bicycle rides and of the type having a tubular frame with an elevated handlebar tube, an elevated seat assembly tube, and an elevated pedal assembly housing. The tubular frame is composed of tubular metal with a front member, a rear member, and a connection member. The rear member is designed to accept a seat shaft tube. The connection member is designed to be connected to a pedal assembly housing. The front member is designed to accept a swing arm and provide movement for a steering shaft. In addition, front support tubes facilitate support to the handlebar tube and rear support tubes facilitate support to the seat shaft tube.

1 Claim, 2 Drawing Sheets

HIGH-BICYCLE FRAME

Background—Field of the Invention

This invention relates to bicycle frames, specifically to bicycle frames which allow the bicycle rider to operate a bicycle with an elevated seat assembly, an elevated handlebar assembly, and an elevated pedal assembly.

Background—Description of Prior Art

Retail stores and bicycle shops commonly supply customers with bicycles to ride for recreational and transportational purposes. Such bicycles are also used by young children, teenage children, and grown-ups for exercise and fun.

Originally, these bicycles evolved from a 2-wheeled vehicle called Draisine constructed in 1816 in Germany. It consisted of a saddle on a wooden bar which was attached to two mediumsize wheels that the rider moved by pushing his feet backward against the ground. A handle was attached to the front axle for steering.

Improvements came later by different inventors. In 1839 a Scots blacksmith attached treadles to rods attached to cranks on the rear axle which later became the chain and sprocket. In 1845 the pedals were moved from under the handlebars to a position under the saddle. To make mounting easier, handlebars were developed more like the modern ones and the slope of the front fork was changed along with a drop frame.

In 1861 the velocipede was created in France. It was a vehicle propelled by pedals connected to the front axle. It produced a rough ride over cobblestones because it had wooden wheels with iron rims. In 1869 rubber tires came to be used.

Other models were made in the 1860's. Pierre Lallement obtained a Design Patent for one model in Nov., 1866. The term bicycle was first used in a patent in 1869.

The velocipede had little speed. Later versions had a larger front wheel and a smaller rear wheel. The rider could not reach the pedals and the seat was high so basically the machine was used for sport.

The practical bike was designed in 1879. It was a 2-wheeler driven by a mechanism attached to the rear wheel by a chain. This machine was called the safety bicycle.

The prototype of the modern bicycle was introduced in 1886. It had two 30" wheels with hubs 41" apart from each other. The pedals and sprocket were mounted between wheels below a 40" high saddle. The bicycle changed little thereafter, except for refinements.

Thereafter, inventors produced many types of bicycles for consumers to ride. However, consumers complained about the possible attack by dogs and heat from the rolling surface during the riding process. Consumers also complained about how most bicycle frames were produced from a basic, standard format. Consumers also complained about one high-bicycle frame which produced a shakey, spongy movement in the handlebar and seat assembly.

Inventors produced many types of bicycle frames to try to solve the uniformity problem that the consumer complained about. Design Patent 238,419 to Apodaca (1973) discloses a bicycle frame with an elevated seat assembly, an elevated pedal assembly, and an elevated handlebar assembly. Such a bicycle frame can be used only by a lightweight rider. Lack of braces for the handlebar tubing assembly allows a certain amount of sponginess in the handlebars during operation. The tubing brace for the seat tube makes it difficult for the rider to cross his or her leg over the support brace during mounting. Apodaca's patent therefore provides a shakey handlebar and a mounting problem due to the seat support tube. Lack of braces for the handlebar tube allows the tube to bend or possibly break and also allows for a lightweight frontend which could possibly cause the rider to flip the bicycle backwards.

Design Patent 277,774 to Traylor (1982) discloses a bicycle frame with a nonstandard design. The seat assembly is actually located lower to the riding surface in the central part of the frame and the pedal assembly is located in front of the front wheel assembly. This patent produces a front-wheel drive bicycle but is still closer to the rolling surface and less visible to automobile drivers but easily accessible to dog attacks.

Design Patent 278,324 to Breen (1982) discloses another frame of nonstandard design. The rear-wheel drive bicycle consists of a large rear wheel and small front wheel with the pedal assembly in front of the front wheel. This design provides a comfortable ride but still allows attacks by dogs and less visibility by automobile drivers.

Design Patent 243,165 to M. A. Wheeler (1976) produces a modified version of the standard bicycle frame. There are slight modifications in the tubular structure but the seat and handlebar assembly are located basically the same standard height of 3"-5" above the frame assembly. Dog attacks along with the possibility of vision problems of automobile drivers are still disadvantages to this standard bicycle frame.

All bicycle frames known to date suffer from a certain number of known disadvantages:

(a) The total height of most of the bicycle frames makes it difficult for an automobile driver to visually identify an operator-powered bicycle therefore creating a change for automobile-bicycle accidents.

(b) The height of the pedal assembly on the standard bicycle frame is low enough to the rolling surface that it allows dogs and other animals to attack the bicycle operator's legs.

(c) The height of the seat assembly and handlebar assembly on the standard bicycle frame is low enough to allow dogs and other animals to attack the bicycle operator's hands, arms, and upper body parts.

(d) The standard bicycle frame height allows the operator's vision to be obstructed by bushes, cars, large trucks, and other low-lying obstructions.

(e) Due to the height of the standard frame, debri from the rolling surface can more readily fly up and hit the rider.

(f) On the standard frame, when the wheel assemblies become loose, they can possibly disengage from the frame assembly.

(g) The previous high-bicycle frame patented in 1973 provides sponginess in the handlebars and the seat assembly along with mounting problems due to the seat support tube obstruction.

Objects and Advantages

Accordingly, in addition to the objects and advantages of the bicycles described above, several advantages and objects of the present invention include:

(a) to provide a bicycle frame which allows the operator to avoid attacks by dogs or other animals;
(b) to provide a bicycle frame which allows the operator to see over low-level obstructions such as trees, automobiles, etc;
(c) to provide a bicycle frame which allows the operator to experience more air flow and a cooler air flow since the distance from the heated rolling surface is greater;
(d) to provide a bicycle frame which makes it more difficult for debri from the rolling surface to hit the operator;
(e) to provide a bicycle frame which does not allow for the wheels to disengage or shift direction due to secure mounting by front and rear support tubes;
(f) to provide a bicycle frame which is a challenge to mount and dismount but is readily feasible to operate;
(g) to provide a bicycle frame which is more visible to operators of motorized vehicles due to the taller size; and
(h) one-of-a-kind bicycle frame in a neighborhood.

Further objects and advantages include to produce a bicycle frame which can be used conveniently and easily by the operator, without damage to the operator, which is simple to operate and relatively inexpensive to produce, which can be used by operators who are 5'5" or taller and which can be used over and over again. More objects and advantages will become obvious after reviewing the encompassing description and bicycle frame drawings.

DRAWING FIGURES

In the drawings, the figures have different numbers.

Figure 1:
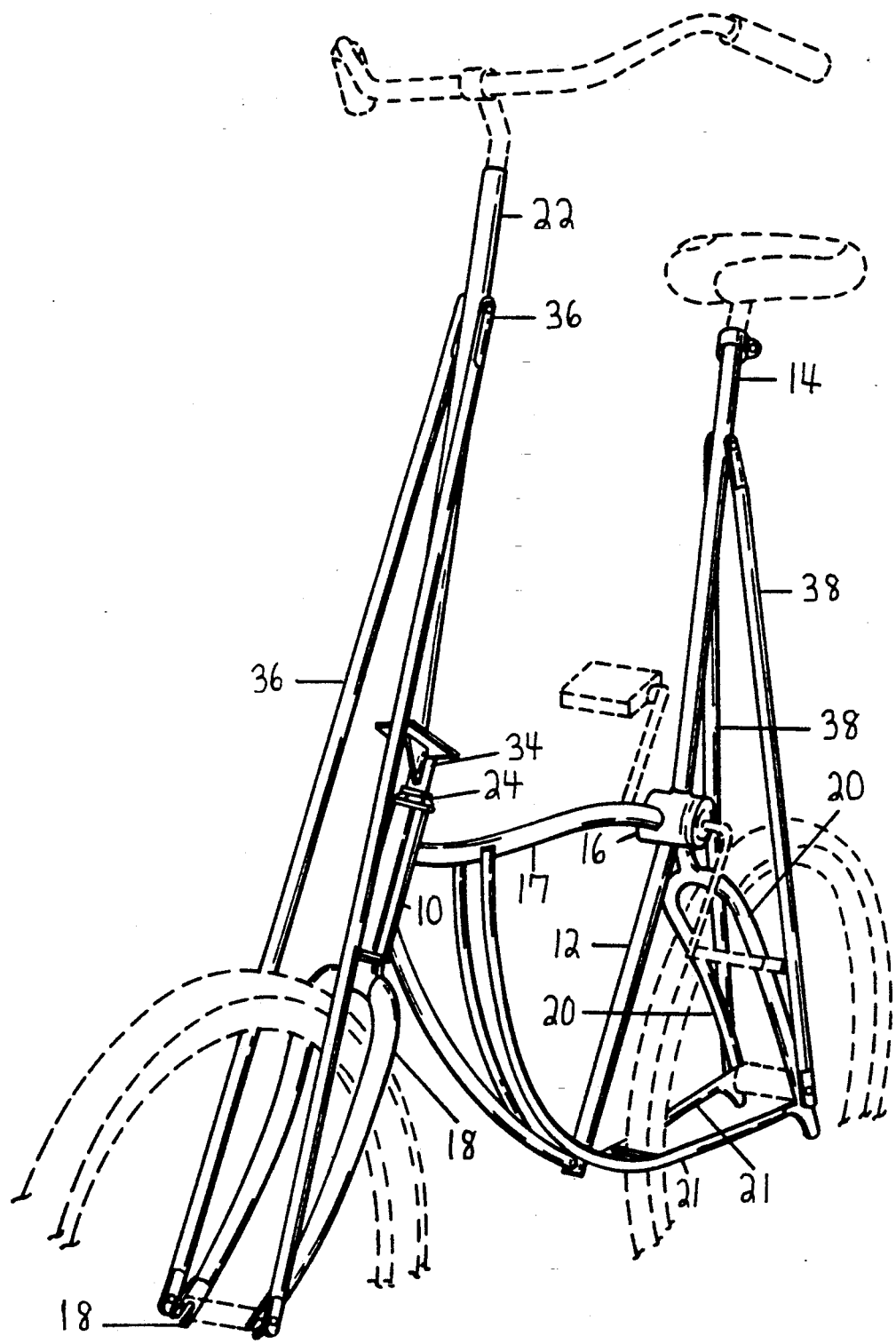
FIG. 1 shows various features of a high-bicycle frame with an elevated seat shaft tube, an elevated handlebar tube, and an elevated pedal assembly housing from an angular view.
Figure 2:
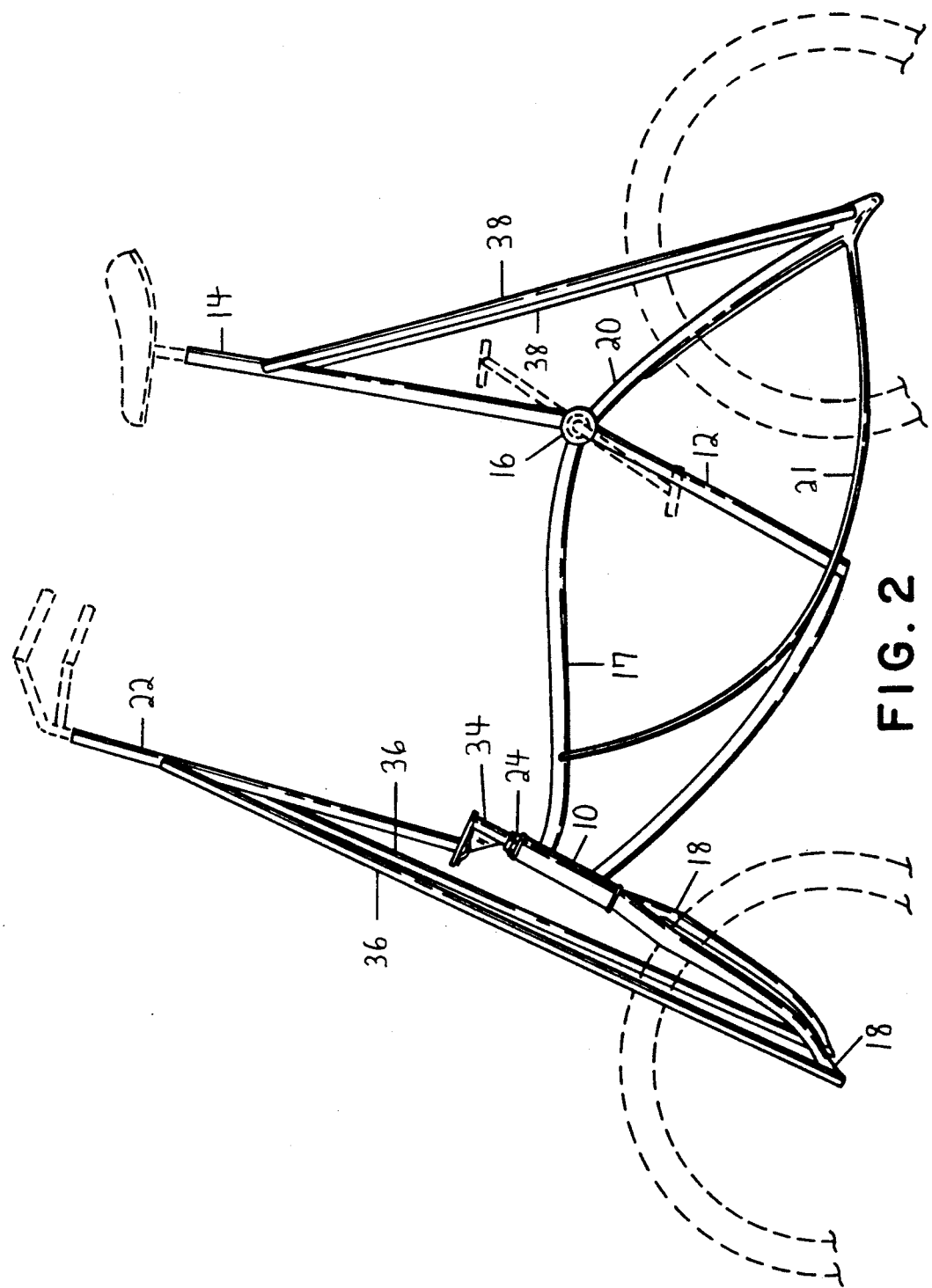
FIG. 2 shows a high-bicycle frame from a side view.

REFERENCE NUMERALS IN DRAWINGS 21 lower end arm
10 front member
12 rear member
14 seat shaft tube
16 pedal assembly housing
17 connection member
18 front end arm
20 rear end arm
22 handlebar tube
24 steering shaft
34 swing arm
36 front support tube
38 rear support tube A typical understanding of the present invention is shown in FIG. 1 (angular view) and FIG. 2 (side view). The bicycle frame has a tubular frame with a tubular front member 10 which is positioned in a primarily vertical position. In the preferred embodiment, the tubular frame is made of round shape metal tubing. However, the tubular frame can consist of any material that can be shaped such as nylon, vinyl, polypropylene, polystyrene, or other materials that have a stiff texture.

At the aft portion of the tubular frame is the rear member 12 which is located in a primarily vertical position. This rear member 12 is designed to accept an elevated pedal assembly housing 16. At the central part of the tubular frame is a connection member 17 which is elongated and couples the front member 10 to the rear member 12. An elevated pedal assembly housing 16 is mounted to the top portion of the rear member 12 for receiving an elevated seat shaft tube 14. The frame entails an elevated seat shaft tube 14 mounted to the top portion of the elevated pedal assembly housing 16 and extending upwardly in a primarily vertical position.

The bicycle frame is comprised of a swing arm 34 with swing movement having a pair of front end arms 18 that are mounted and pivot on the front member 10 through means of a steering shaft 24. The frame is designed with a pair of rear end arms 20 extending outwardly from the rear member 12 and a pair of lower end arms 21 extending horizontally from the rear member 12.

The bicycle frame is also designed with a pair of rear support tubes 38 mounted to the aft portion of the rear end arms 20 and extending upwardly to the upper portion of the elevated seat shaft tube 14. The bicycle frame is designed to provide a means at the upper portion of the elevated seat shaft tube 14 for mounting the rear support tubes 38.

The bicycle frame is designed such that the distance between the axis of pivot movement at the swing arm 34 and the upper portion of the rear member 12 is equal to the distance between the axis of pivot movement at the swing arm 34 and the lower portion of the rear member 12.

The bicycle frame is comprised of an elevated handlebar tube 22 extending upwardly from a swing arm 34 and mounted to said swing arm 34.

The bicycle frame entails an assembly for a bicycle frame that includes a front member 10 that protrudes forwardly and downwardly in the direction of the front end arms 18 to provide movement for a steering shaft 24. The bicycle frame comprises a pair of front end arms 18 for mounting below the front member 10 and a steering shaft 24 that protrudes into the front member 10 from the upper portion of the front end arms 18 for receiving a swing arm 34. The bicycle frame is designed to provide a means at the top of the steering shaft 24 for mounting the swing arm 34 and a means at the top of the swing arm 34 for mounting the elevated handlebar tube 22 which extends upwardly from the swing arm 34.

The bicycle frame comprises a pair of front support tubes 36 mounted on the lower portion of the front end arms 18 extending upwardly to the upper portion of the elevated handlebar tube 22 and a means at the upper portion of the front support tubes 36 for mounting to the upper portion of the elevated handlebar tube 22.

From the above description, a number of advantages of our high-bicycle frame become evident:
(a) The increase in bicycle frame height could prevent dog attacks to the operator, assist the operator's vision in overcoming low-level obstructions, and assist the operator with more, cooler airflow.
(b) The use of a high-bicycle frame would provide more protection from debri flying up from the rolling surface.
(c) The high-bicycle frame would provide a bicycle frame which provides more secure attachment of the front and rear wheels due to support tubes.
(d) This bicycle frame invention provides a challenge to ride and is easier to be noticed by motorized vehicles.
(e) This frame would give the operator a sense of individuality by being a one-of-a-kind in a neighborhood.

Operation—FIGS. 1 and 2

The manner of using the high-bicycle frame is almost identical to that for bicycle frames in present use. As shown in FIG. 1, the bicycle frame is positioned first so that the plane of its base is perpendicular to the axis of rolling surface. One attaches a handlebar assembly into the top of the handlebar tube 22. Next one attaches a seat assembly into the top of the seat shaft 14. One the installs a pedal assembly into the pedal assembly housing 16.

Then the frame is turned upside down with the handlebar assembly and seat assembly on the bottom. One attaches a front wheel assembly to the lower ends of the front end arms 18 and the lower ends of the front support tubes 36. Next one assembles the chain assembly around the gear on the pedal assembly and the gear on the rear wheel assembly to provide a variable speed-to-power ratio of a continuous nature. One attaches a rear wheel assembly to the lower ends of the rear end arms 20 and the lower ends of the rear support tubes 38.

Then the frame is turned right side up with the handlebar assembly and the seat assembly on the top of the frame. As shown in FIGS. 1 and 2, the bicycle frame is positioned so that the plane of its base is perpendicular to the axis of the rolling surface, the frame is now operational for the rider to mount, operate, and dismount.

SUMMARY, RAMIFICATIONS, AND SCOPE

Accordingly, the reader will understand that the high-bicycle frame of this invention can be used to ride and operate easily and conveniently, can be used without damage to the operator and the rolling surface, and can be used again without requiring a new bicycle. In addition, when the bicycle frame has been riden and has fallen, the paint on the tubular frame will be scratched or damaged and thus give evidence of tampering, without restricting the ability of the frame to be reused by the original operator or another operator. Furthermore, the high-bicycle frame has the additional advantages in that

- it provides a bicycle frame which protects the operator from dogs or other attacking animals;
- it provides the operator's vision from being obstructed by low-level obstructions;
- it provides the operator to experience more, cooler air flow during operation;
- it provides the operator protection from debri from the rolling surface;
- it provides a bicycle frame with more securely attached front and rear wheels;
- it provides a bicycle frame which provides a challenge to mount and dismount;
- it provides the bicycle operator the advantage of more visibility; and
- it provides the operator with a bicycle frame unlike any of the others in the neighborhood.

Although the above description contains many specifications, these should not limit the scope of the invention but merely provide illustrations of some of the preferred embodiments of this high-bicycle frame invention. For example, the tubular frame can have other shapes such as square, oval, hexagonal, triangular, etc.; the tubular front member, the tubular rear member, and the connection member can have different designs.

Thus the scope of the invention should be construed by the claims and their legal equivalents, rather than be determined by the given examples.

I claim:

1. A bicycle frame comprising:

a frame composed of tubular metal having a front member in a primarily vertical position for receiving a steering shaft;

a rear member in a primarily vertical position for mounting an elevated pedal assembly housing;

a connection member for coupling the front member to the rear member;

an elevated pedal assembly housing mounted on the top portion of the rear member for receiving an elevated seat shaft tube;

the elevated seat shaft tube for mounting on the top portion of the elevated pedal assembly housing and extending upwardly in a primarily vertical position;

a swing arm with swing movement having a pair of front end arms for mounting a front wheel and pivoting through means of a steering shaft;

a pair or rear end arms extending outwardly from the upper portion of the rear member; and connected at one end to the pedal assembly housing and mounting a rear wheel at the other end;

a pair of lower end arms connected to and extending primarily horizontally from the lower portion of the rear member to the lower portion of the rear end arms;

a pair of rear support tubes connected to the lower portion of the rear end arms and extending upwardly to the upper portion of the elevated seat shaft tube;

means at the upper portion of the elevated seat shaft tube for mounting the rear support tubes;

the distance between the axis of pivot movement at the swing arm and the upper portion of the rear member being equal to the distance between the axis of pivot movement at the swing arm and the lower portion of the rear member;

an elevated handlebar tube connected to the swing arm and extending upwardly;

a steering shaft protruding into the front member from the upper portion of the front end arms for pivoting said front wheel;

means at the top of the swing arm for mounting said elevated handlebar tube and extending upwardly from the swing arm;

a pair of front support tubes mounted on the lower portion of the front end arms extending upwardly to the upper portion of the elevated handlebar tube; and means at the upper portion of the front support tubes for mounting the front support tubes to the upper portion of the elevated handlebar tube.

* * * * *